May 8, 1934.   L. B. SEBRELL   1,958,072
METHOD OF MAKING MOLDS
Filed Dec. 11, 1929

Inventor
Lorin B. Sebrell
By
Attorney

Patented May 8, 1934

1,958,072

UNITED STATES PATENT OFFICE 1,958,072

METHOD OF MAKING MOLDS

Lorin B. Sebrell, Akron, Ohio, assignor to Wingfoot Corporation, Wilmington, Del., a corporation of Delaware Application December 11, 1929, Serial No. 413,222

2 Claims. (Cl. 204—6)

This invention relates to a tire mold, and it has particular relation to a method of making a matrix for the mold which is adapted to form the tread elements of a tire during vulcanizing of the latter.

An object of the invention is to provide a method of making a matrix of the above-designated character, which utilizes the electrolytic method of plating metal upon an electrical conductor.

Another object of the invention is to provide a method of making such a matrix which includes utilizing a core composed of a material capable of conducting an electric current.

In the manufacture of pneumatic tires, sectional molds are employed for supporting the walls of the tire during vulcanizing thereof, in which each section of the mold supports a side wall and a part of the tread portion of the tire. That part of the mold section supporting the tread portion of the tire necessarily is embossed in order to provide non-skid tread elements upon the outer surface of the tire. Heretofore the embossing of the mold sections has been an expensive operation, because of the fact that the operation required highly skilled labor and required much time. Manifestly, if removable inserts can be employed for forming the tread elements upon the tire, and the inserts manufactured without requiring the manual operation of embossing the tire engaging surfaces thereof, the expense of manufacturing tires will be reduced considerably.

According to this invention, a core substantially of the shape of a tire is formed of material capable of conducting an electric current. Such material may be composed of ferric oxide and carbon preferably retained together by a binder such as sodium silicate. The outer surface of the core is provided with an embossed surface identical with the tread surface of the tire to be vulcanized, by subjecting the material to pressure within complementary mold sections having embossed surfaces complementary to the embossed surface to be formed upon the core. Then the core is disposed in an electrolytic solution in which metal, such as nickel, is an ingredient, with the core forming the cathode of an electrical circuit including the electrolyte. Passage of current through the electrical circuit results in the deposition of the metallic ingredient nickel in the solution, upon the outer surface of the core. After a metallic coating of sufficient thickness is deposited upon the core, the latter is removed from the electrolyte. Then the coating is partially cut away from the core and the latter is removed in any suitable manner. The metallic matrix thus formed then is severed along a circumferentially extending medial line thereby providing two sections, and each section thereafter reinforced by a metallic backing deposited upon its outer surface. The sections of the matrix may be then releasably secured in a tire mold.

For a better understanding of the invention, reference may now be had to the accompanying drawing, forming a part of this specification in which.

Figure 1:
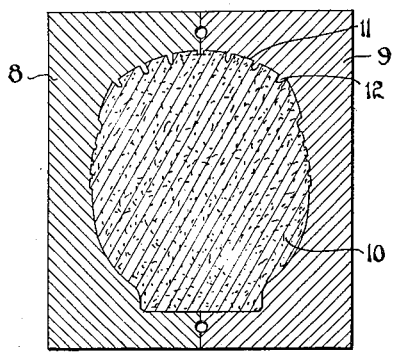
Fig. 1 is a cross-sectional view of a sectional mold enclosing a core constructed according to one form of the invention.
Figure 3:
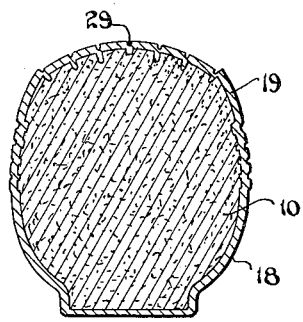
Fig. 3 is a cross-sectional view of the core shown by Fig. 1 after it has been plated in the apparatus shown by Fig. 2.
Figure 2:
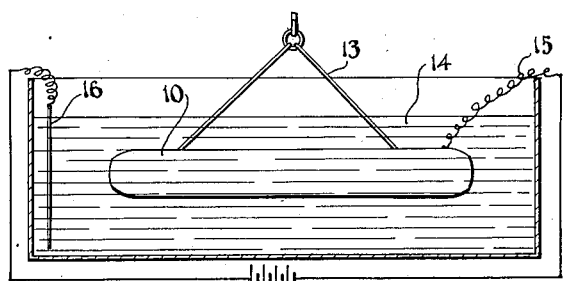
Fig. 2 is a cross-sectional view of an electroplating apparatus adapted for plating the core shown by Fig. 1.
Figure 5:
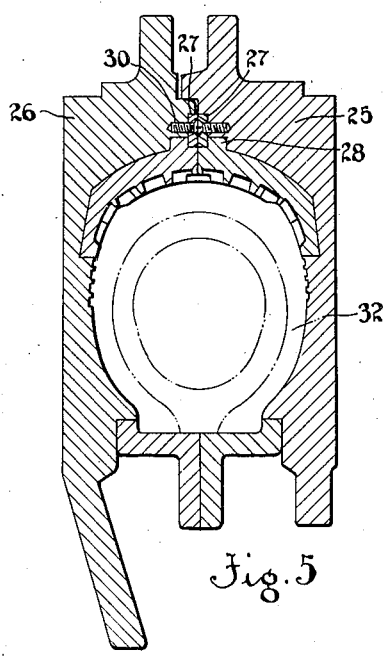
Fig. 5 illustrates a tire mold in which the matrix shown by Fig. 4 is utilized.
Figure 4:
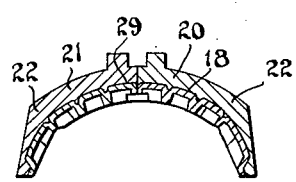
Fig. 4 is a cross-sectional view of a metallic matrix formed according to one embodiment of the invention, having a metallic reinforcement upon its outer surface.

In practicing the invention a core 10 is provided, which preferably is composed of carbon and ferric oxide, because these materials are electrical conductors that are readily available. These materials in comminuted or powdered form are mixed with a binder such as molasses or sodium silicate, and compressed between a pair of mold sections 8 and 9 to a shape identical with that of a pneumatic tire. During the aforesaid operation, the outer peripheral surface of the core is formed with tread elements 11, by complementary tread forming surfaces 12 of the mold. These elements may be of any design suitable for use as a tread for a tire. The core 10 thus formed is suspended by means such as indicated at 13 in Fig. 2, in a vessel 14 which contains an electrolytic solution. Preferably, the solution contains the metal nickel, and a suitable composition therefor is as follows: $NiSO_4.6H_2O$, 733 pounds; $NiCl_2.6H_2O$, 61 pounds; $H_3BO_3$ 98 pounds; and water, 290 gallons. The core 10 constitutes the cathode of an electrical circuit 15 which includes the electrolyte and a bar 16 submerged in the solution, constitutes the anode. During passage of the current from a battery 17 in the circuit, through the electrolyte, nickel is deposited uniformly upon the outer surface of the core 10 and this process is continued until a substantial thickness of metal as indicated at 18 in Fig. 3 is deposited upon the core 10. Then the core is withdrawn from the electrolyte and substantially the radial inner half of the coating 18 is removed by cutting through the metal in a circumferential direction along the sides thereof. This exposes the lower portion of the core which then is removed by any suitable manually operated tool. That part of the core disposed closely adjacent the metallic coating may be removed by a stream of air or a stream of liquid.

A nickel matrix 19 thus remaining is then severed along a median line 29 extending circumferentially of the matrix, thereby forming two sections 20 and 21. Each of the sections then is reinforced by metal 22 such as babbitt, which may be associated therewith by pouring the metal in a molten state upon the outer surface of the section during which operation it is retained in a suitable forming mold. The two sections 20 and 21 of the matrix then are mounted in a pair of mold sections 25 and 26 and secured therein by rings 27 engaging flanges 28 formed on the outer peripheral surfaces of the matrix sections. The rings 27 are releasably secured to the molds by screws 30.

It is apparent that the inner peripheral surfaces of the matrix sections 20 and 21 are provided with tread surfaces that form tread elements upon a tire 32 disposed between the mold sections 25 and 26, during the vulcanizing operation. Also, it is apparent that the mold sections may be readily removed from the tire.

It is to be understood that the electrolyte employed need not be limited to one having nickel as an ingredient, but any of the well known electrolytes having a metallic ingredient may be employed. Also, it is to be understood that the core 10 need not be limited to a composition of carbon and iron, but that other electrical conducting materials may be used. Moreover, the proportions of carbon and iron employed, as well as any binder associated therewith, may be varied as found desirable.

From the foregoing description it is apparent that a simple and efficient method has been provided for manufacturing matrices for tire molds and that the matrix may be made very accurately by reason of the fact that metal is deposited uniformly upon the core by the electro-plating process. Very little labor is required in manufacturing such a matrix and this advantage necessarily is reflected in a lower cost of manufacturing tires.

Although only the preferred form of the invention has been shown and described in detail, it will be apparent to those skilled in the art that the invention is not so limited but that various modifications may be made therein without departing from the spirit of the invention or from the scope of the appended claims.

What I claim is:

1. The method of preparing tread section inserts for a tire mold which comprises forming a core in the shape of a tire, coating the outside of said core with metal, separating the coating on the tread from the remainder of the coating, dividing the tread coating along a circumferentially extending medial line and removing the tread coating from the core.

2. The method of preparing tread section inserts for a tire mold which comprises forming a solid core of electro-conductive material in the shape of a tire, completely coating the outside of said core with metal, separating the coating on the tread from the remainder of the coating, dividing the tread coating along a circumferentially extending medial line and removing the tread coating from the core.

LORIN B. SEBRELL.